(12) United States Patent  
Kritt et al.

(10) Patent No.: US 8,756,013 B2  
(45) Date of Patent: Jun. 17, 2014

(54) PERSONALIZED ROUTE GENERATION

(75) Inventors: Barry A Kritt, Raleigh, NC (US);  
Thomas S Mazzeo, Durham, NC (US);  
Sarbajit K Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 13/443,163

(22) Filed: Apr. 10, 2012

(65) Prior Publication Data

US 2013/0268189 A1    Oct. 10, 2013

(51) Int. Cl.  
*G01C 21/00*    (2006.01)

(52) U.S. Cl.  
USPC .......................................... 701/533; 701/410

(58) Field of Classification Search  
USPC .................................. 701/410, 533  
See application file for complete search history.

(56) References Cited

U.S. PATENT DOCUMENTS

| | | | |
|---|---|---|---|
| 6,028,553 A | 2/2000 | Oberstein | |
| 8,255,411 B1* | 8/2012 | Carpenter et al. | 707/764 |
| 8,433,512 B1* | 4/2013 | Lopatenko et al. | 701/426 |
| 2002/0177945 A1 | 11/2002 | Davies | |
| 2008/0300784 A1 | 12/2008 | Kleinstern et al. | |
| 2009/0171568 A1* | 7/2009 | McQuaide, Jr. | 701/206 |
| 2009/0271104 A1 | 10/2009 | Letchner et al. | |
| 2009/0281726 A1 | 11/2009 | Byrne et al. | |
| 2009/0326800 A1 | 12/2009 | Kalaboukis et al. | |
| 2010/0027527 A1 | 2/2010 | Higgins et al. | |
| 2010/0121566 A1 | 5/2010 | Joshi et al. | |
| 2010/0211304 A1 | 8/2010 | Hwang et al. | |
| 2011/0010241 A1 | 1/2011 | Mays | |
| 2011/0046876 A1 | 2/2011 | Pan et al. | |
| 2011/0046881 A1 | 2/2011 | Karaoguz | |
| 2012/0197696 A1* | 8/2012 | Beyeler et al. | 705/14.4 |
| 2013/0035853 A1* | 2/2013 | Stout et al. | 701/438 |

FOREIGN PATENT DOCUMENTS

| | | |
|---|---|---|
| EP | 081448 | 12/1997 |
| EP | 2393056 A1 * | 12/2011 |

OTHER PUBLICATIONS

Zhijun Yin et al., Mining Interesting Tourist Route Patterns From Geotagged Social Media, 2011, 16 pages, University of Illinois at Urbana-Champaign, Kodak Research Laboratories.

Liangliang Cao et al., A Worldwide Tourism REcommendation System Based on Geotagges Web Photos, 2010, 4 pages, University of Illinois at Urbana-Champaign, Kodak Research Laboratories.

Dirksen Liu et al., Recommend Touring Routes to Travelers According to Their Sequential Wandering Behaviors, Dec. 2009, 6 pages, ISPAN 10th Inter. Symp.

(Continued)

*Primary Examiner* — Fadey Jabr  
*Assistant Examiner* — Yazan A Soofi  
(74) *Attorney, Agent, or Firm* — Kunzler Law Group (57) ABSTRACT

Systems and computer program products provide personalized route generation with computer readable program code, when read by a processor, configured for storing in a memory an image viewing pattern and determining a first object viewing interest from the image viewing pattern. The image viewing pattern may be based at least in part on an image viewing history. The first object viewing interest may be depicted in at least one image in the image viewing history. The code is also configured for receiving a request for directions to a destination in a geographic region, identifying a first area in an electronic map of the geographic region and generating a first route to the destination. The first area may include the first object viewing interest. The first route may feature the first area.

11 Claims, 8 Drawing Sheets

(56) References Cited

OTHER PUBLICATIONS

Marco Mamei et al., Automatic Analysis of Geotagged Photos for Intelligent Tourist Services, Jul. 2010, 6 pages, IE Sixth International Conference.

U.S. Appl. No. 13/781,634, Office Action, Jul. 5, 2013.

Harris, Mark, "Automatic Image Tagging Gets Smarter", techradar, Oct. 9, 2008, pp. 5, http://www.techradar.com/news/internet/automatic-image-tagging-gets-smarter-474886.

Visser, Rene, "Object Recognition for Video Retrieval", Leiden University, downloaded as early as Aug. 4, 2011, pp. 7, Leiden, The Netherlands, http://citeseerx.ist.psu.edu/viewdoc/download?doe=1.1.3.3101&rep1&type=pdf.

"Add Name Tags in Picasa", Google, downloaded as early as Aug. 4, 2011, pp. 4, http://picasa.google.com/support/bin/answer.py?hl=en&answer=156272.

Picasa 3.5 Released With Face Tagging Feature, http://www.shoutmeloud.com/picasa-3-5-released-with-face-tagging-feature.html, Sep. 23, 2009, Available on Internet Archive http://web.archive.org/web/20110926024716/http://www.shoutmeloud.com/picasa-3-5-released-with-face-tagging-feature.html as of Sep. 26, 2011.

* cited by examiner

PERSONALIZED ROUTE GENERATION

BACKGROUND

The present invention relates to generation of a route to a destination, and more specifically, to generation of a personalized route to a destination in an electronic map, the personalized route featuring one or more object viewing interests.

Generally, computer users view a lot of images, such as videos or pictures. For example, before traveling to an unfamiliar place or area, a user may watch a video from a video portal (such as YouTube) or view a picture from an image portal (such as Picasa). Because the area is unfamiliar, the user may require a computer generated route to a destination in the area. Navigation systems or software containing routing modules and map data are capable of providing routes based upon a start point and end destination of the user. Typically, however, these devices operate independent of the identity of the user, providing the same route and travel information to the destination, regardless of who submitted the request.

BRIEF SUMMARY

According to one embodiment of the present invention, a computer program product may include a computer readable storage medium having computer readable program code embodied therewith. The computer readable program code, when read by a processor, may be configured to store in a memory an image viewing pattern. The image viewing pattern may be based at least in part on an image viewing history. The computer readable program code may be further configured to determine a first object viewing interest from the image viewing pattern, the first object viewing interest depicted in at least one image in the image viewing history. The computer readable program code may be further configured to receive a request for directions to a destination in a geographic region, identify a first area in an electronic map of the geographic region, the first area including the first object viewing interest and generate a first route to the destination, the first route featuring the first area.

In some embodiments of the present invention, the computer readable program code may be further configured to store in the memory a user profile, wherein the image viewing history includes a plurality of images accessed by the user profile, and/or determine the image viewing pattern based at least in part on a user image preference provided by a user input, the user input stored in the user profile. Additionally and/or alternatively, the computer readable program code may be further configured to determine a second object viewing interest from the image viewing pattern, identify a second area in the electronic map, the second area including the second object viewing interest, and generate a second route to the destination, the second route featuring the second area. Additionally and/or alternatively, the computer readable program code may be further configured to rank the first route and the second route, wherein the rank of the first route may be based at least in part on a frequency the first object viewing interest is depicted in the viewing history and the rank of the second route may be based at least in part on a frequency the second object viewing interest is depicted in the viewing history.

In yet another embodiment of the present invention, a computer is provided. The computer may include a processor, a memory and/or a program including a plurality of instructions stored in the memory. The plurality of instructions may be executed by the processor to store in the memory an image viewing pattern, the image viewing pattern based at least in part on an image viewing history and determine a first object viewing interest from the image viewing pattern, the first object viewing interest depicted in at least one image in the image viewing history. The plurality of instructions may be further executed by the processor to receive a request for directions to a destination in a geographic region, identify a first area in an electronic map of the geographic region, the first area including the first object viewing interest; and generate a first route to the destination, the first route featuring the first area.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF cable , etc., or any suitable combination of the foregoing.

Computer program code for carrying out operations for aspects of the present invention may be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
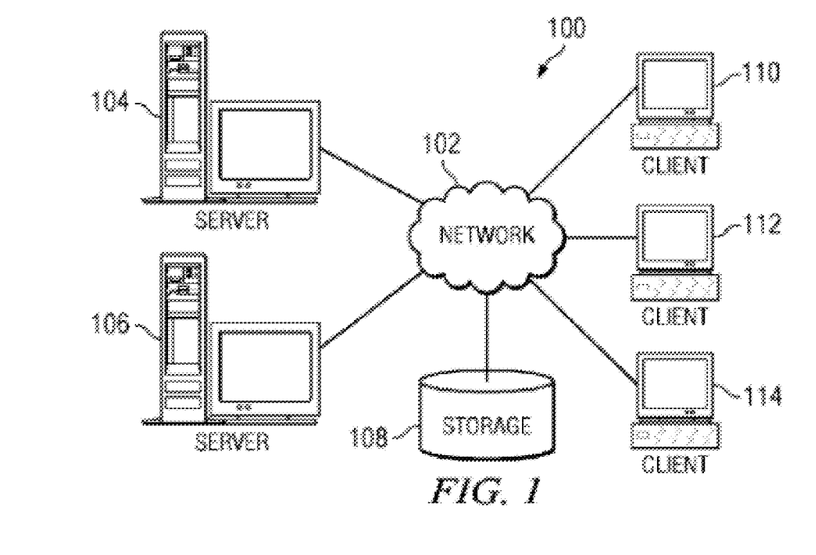
FIG. 1 is a pictorial representation of an example of a computer system in which illustrative embodiments may be implemented.
Figure 2:
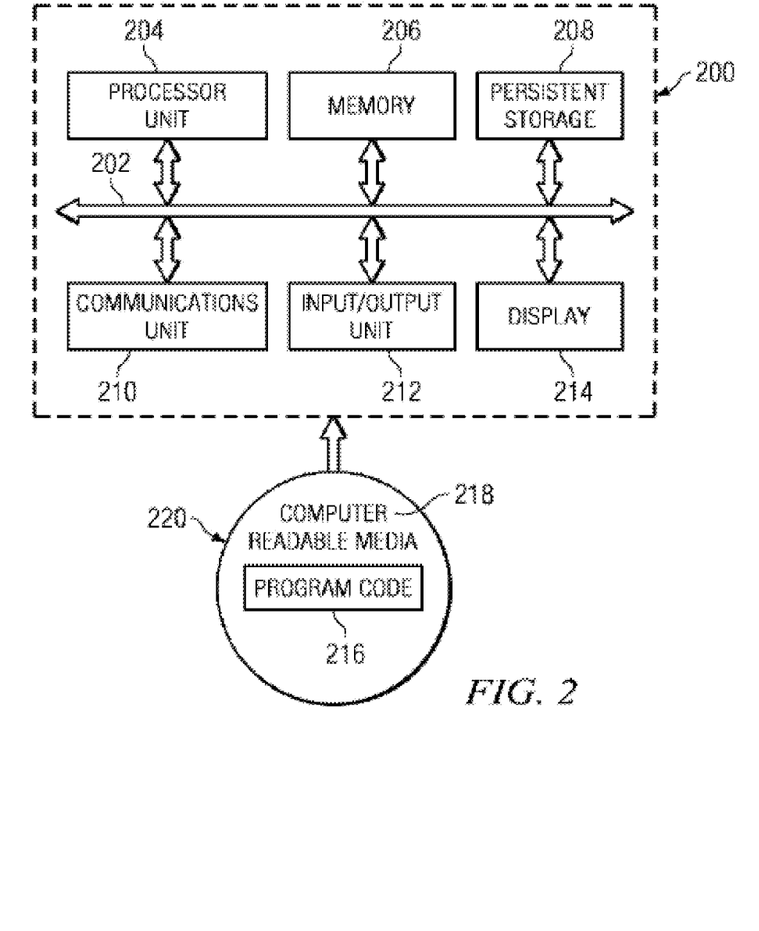
FIG. 2 is a block diagram of an example of a computer in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a computer system, indicated generally at 100, and including a network of computers in which illustrative embodiments may be implemented. Computer system 100 may contain a network 102, which is the medium used to provide communications links between various devices and computers connected together within computer system 100. Network 102 may include connections, such as wire, wireless communication links, or fiber optic cables.

In the depicted example, a server 104 and a server 106 may connect to network 102 along with a storage unit 108. In addition, a first client computer 110, a second client computer 112, and a third client computer 114 may connect to network 102. Client computers 110, 112, and 114 may be, for example, personal computers or network computers. In the depicted example, server 104 may provide data, such as boot files, operating system images, and/or software applications to client computers 110, 112, and 114. Client computers 110, 112, and 114 are clients to server 104 in this example. Computer system 100 may include additional servers, clients, and other devices not shown, or may include fewer devices than those shown.

In the depicted example, network 102 may be or may include the Internet. Computer system 100 also may be implemented with a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer or a computer system, such as a server, client computer, gaming system, personal digital assistant (pda), smart phone, mobile device or any other computer or device that functions like a computer, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 may serve to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device may include any piece of hardware that is capable of storing information either on a temporary basis and/or a permanent basis. Memory 206 may include, for example, a random access memory or any other suitable volatile or non-volatile storage device. Persistent storage 208 may take various forms depending on the particular implementation. For example, persistent storage 208 may contain one or more components or devices. For example, persistent storage 208 may include a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210 may provide for communications with other data processing systems or devices and/or one or more networks such as a local area network (LAN), a general wide area network (WAN), and/or a public network (e.g., the Internet).

Some embodiments of communications unit 210 may include a network interface card. Communications unit 210 may provide communications through the use of either or both physical and wireless communications links.

Input/output unit 212 may allow for input and output of data with other devices that may be connected to data processing system 200. For example, input/output unit 212 may provide a connection for user input through a keyboard and mouse. Further, input/output unit 212 may send output to a printer. Display 214 may provide a mechanism to display information to a user.

Instructions for the operating system and applications or programs may be located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 may be located in a functional form on computer-readable media 218 that is selectively removable and may be loaded onto or transferred to data processing system 200 for execution by processor unit 204. Program code 216 and computer-readable media 218 may form computer program product 220. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 may include hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. The bus system may be implemented using any suitable type of architecture that provides for a transfer of data between different components or devices attached to the bus system. Additionally, a communications unit may include one or more devices used to transmit and receive data, such as a modem or a network adapter. Further, a memory may include, for example, memory 206 or a cache such as found in an interface and memory controller hub that maybe present in communications fabric 202.

A computer or computer system, such as those depicted in FIGS. 1 and 2, may track and/or store an image viewing history, determine an image viewing pattern and/or generate a personalized route recommendation in an electronic map, based at least in part on the image viewing history and/or image viewing pattern. Multiple personalized routes may be determined and may be ranked based at least in part on the image viewing pattern. Along with the recommended route(s), user may be provided with different object name(s) available to view along the route(s).

The images, such as picture images or video images, may be stored online, in memory 206, server 104, 106, network 102 and/or storage 108. The images may include geographical or object identification metadata, for example via manual or automatic image object tagging, geotagging and/or any other means of means of providing identification for objects and/or locations in images.

The image viewing history may include one or more of the date, time, day, location and/or number of times of image viewing. The image viewing history may include a plurality of images accessed by a user profile. In other words, the image viewing history may be associated with a particular computer and/or computer user by any means known to those skilled in the art. Prior to use of the computer, a user, for example client computer 110-114, may enter identifying information, such as a login and password, to start the computer and/or to access server 104, 106, network 102 and/or storage 108.

An image viewing pattern may be generated based at least in part on the image viewing history. The image viewing pattern, as described in further detail below with reference to FIG. 5, may determine the types of interests the user has. Additionally and/or alternatively, the image viewing pattern is based at least in part on a user image preference provided by a user input. For example, the user may provide feedback regarding an image. The feedback may include "dislike" or "like" or any feedback via any means known to those skilled in the art.

One or more object viewing interests, for example a first object viewing interest and/or a second object viewing interest, may be determined based at least in part on the image viewing pattern. For example, the image viewing pattern may determine an object viewing interest as including a common theme or area of interest of the user. Non-limiting examples of one or more object viewing interests may include monuments, buildings, bridges, mountains, statues and/or any other objects known to those skilled in the art. In some embodiments, the one or more object viewing interests may include a theme or an area of interest of the user such as a general category of objects, for example any or all monuments. Additionally and/or alternatively, one or more object viewing interests may include a theme or an area of interest of the user such as a subset of objects, such as presidential monuments. Additionally and/or alternatively, one or more object viewing interests may include a particular object viewed, such as the Washington Monument.

For example, the image viewing history may include a first set of one or more images accessed by the user profile. Each image in the first set may include or depict the first object viewing interest. As a nonlimiting example, the first object viewing interest may include a common theme of scenic landscapes and the images in the first set may depict various scenic landscapes from around the world. The image viewing history may further include a second set of one or more images accessed by the user profile, the second set of images may depict the second object viewing interest. As a nonlimiting example, the second object viewing interest may include a common theme of historic landmarks and the images in the first set may depict various historic landmarks from around the world. The images in the first and second sets of images may overlap, i.e. an image from the first set of images may also be included in the second set of images because the image depicts the first object viewing interest and the second object viewing interest. For example, the image may include a scenic landscape and a historic landmark.

A computer or computer system, such as those depicted in FIGS. 1 and 2, may receive a request for directions to a destination in a geographic region. The computer may also receive a starting point or the starting point may be determined, for example using a global positioning system. In some embodiments, an option may be provided to select a personalized route recommendation. The concentration of the one or more object viewing interests in the geographic region may be determined One or more areas in an electronic map of the geographic region including one or more object viewing interest(s) may be identified. For example, a first area including the first object viewing interest may be identified and a second area including the second object viewing interest may be identified.

One or more routes to the destination may be generated based at least in part on the concentration of one or more object viewing interests in the electronic map of the geographic area. The one or more routes may each feature one or more areas including an object viewing interest. For example, the one or more routes may each be configured such that at least one object viewing interest is visible from the one or more routes. The lengths, distances or courses of the one or more routes may vary and may not include a shortest route to the destination. Accordingly, even though the one or more object viewing interests may not be the primary objective for the request for directions to the destination, the user receives a personalized route to the destination including the one or more objects of interest.

For example, a first route to the destination may feature the first area and a second route to the destination may feature the second area. A third route to the destination may feature both the first area and the second area. The one or more routes may be displayed on a display medium. The areas including an object viewing interest may be indicated on the display medium. Thus, (1) the first object viewing interest and the second object viewing interest may include areas or common themes of interest that the user himself has viewed online photos of, and (2) the first object viewing interest and the second object viewing interest are not the primary objective for the trip, but instead going to the destination is, accordingly the present invention adds to the user's enjoyment of the trip.

In some embodiments, objects found in the images viewing history may determine the object viewing interest(s) or type of viewing interest(s) the user has, and may not literally include the actual objects and/or areas that are featured on a route. As a nonlimiting example, from the image viewing history, an object viewing interest of "mountains" may be determined The user may request a route to a destination in the geographic area of Oregon.

An area in an electronic map may be determined to include Mt. Hood. A route featuring Mt. Hood may be generated. The image viewing history may not include an image of the area and/or of Mt. Hood.

Additionally and/or alternatively, the one or more routes may be ranked. The ranking of the one or more routes may be based at least in part on the image viewing pattern and/or image viewing history. For example, the ranking may be based at least in part on the number of images in the first set of images and the number of images in the second set of images. Additionally and/or alternatively, the ranking may be based at least in part on the frequency an image including one or more object viewing interests has been accessed. Additionally and/or alternatively, the ranking may be based on the number of object viewing interests featured in the route and/or the distance of the route.

The destination may include a particular destination in a geographic area, such as a street address or geographic coordinates. Additionally and/or alternatively, the destination may include a category of destinations, such as "restaurant", in the geographic area. A destination may be determined based at least in part on the category of destinations and the concentration of one or more object viewing interests in the electronic map of the geographic area.

Figure 3:
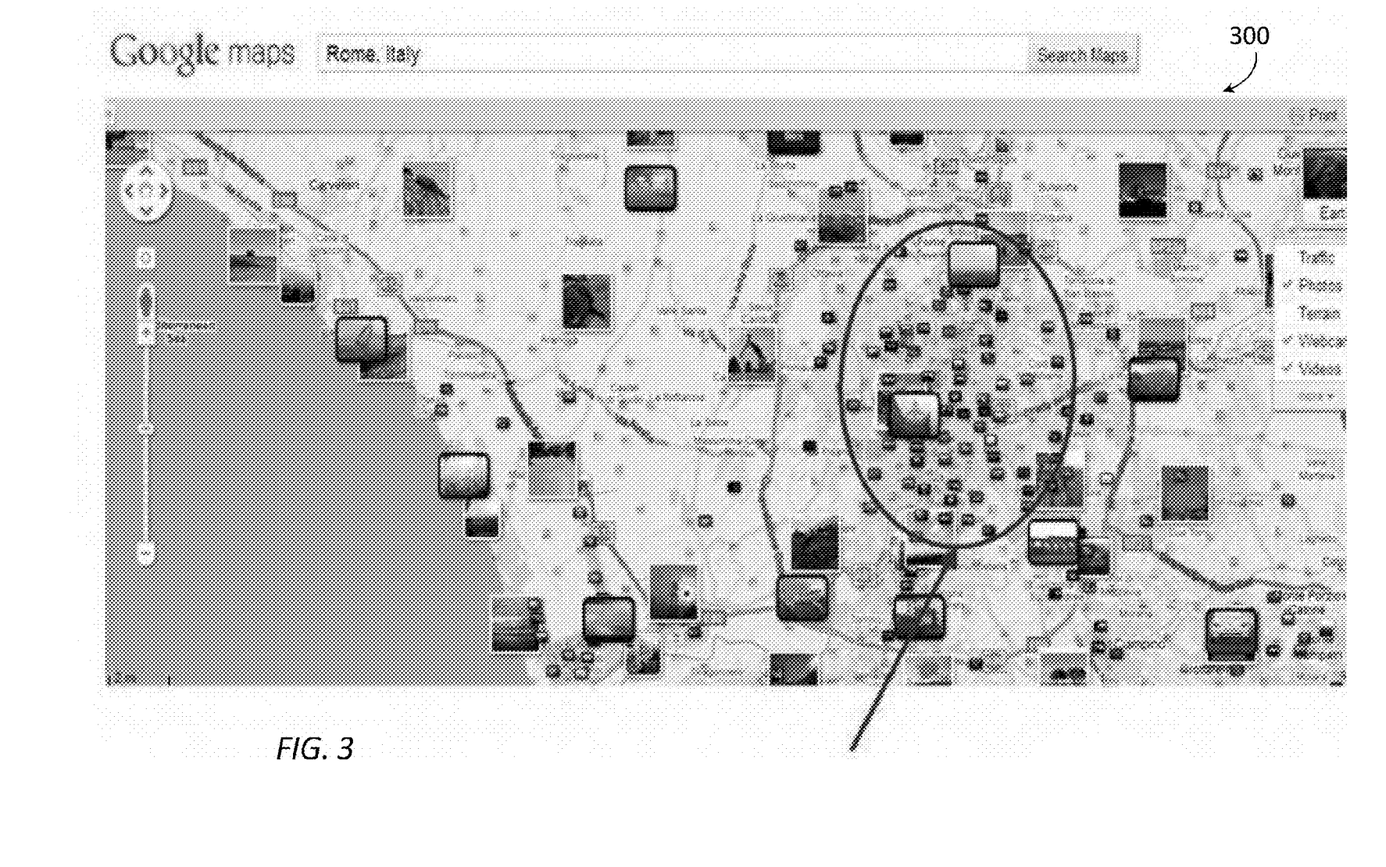
FIG. 3 is a pictorial representation of an example of an electronic map including overlaid images.
Figure 4:
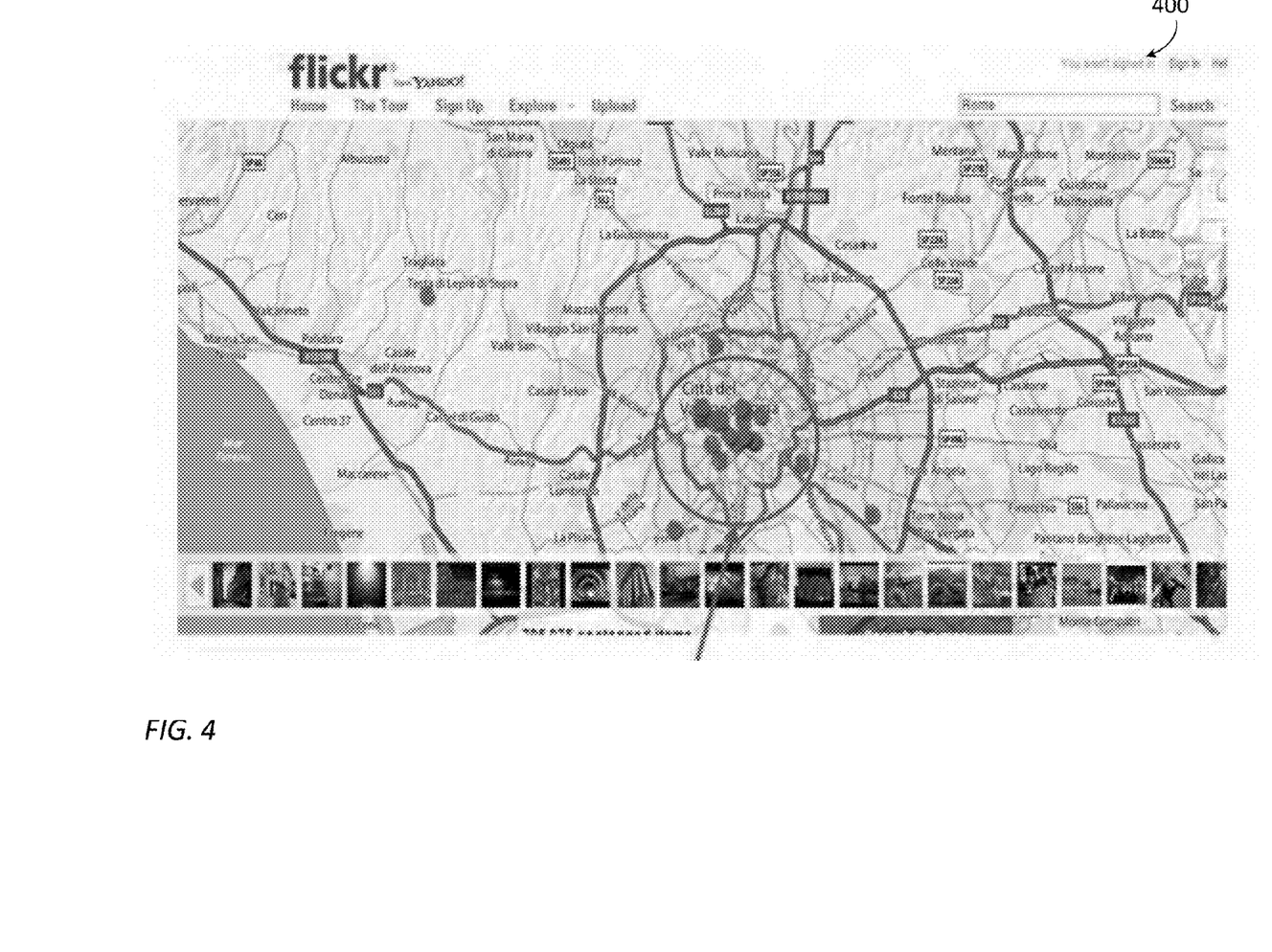
FIG. 4 is a pictorial representation of an example of an electronic map including overlaid images.

A non-limiting example of personalized route generation may be described with reference to FIGS. 3-6. FIG. 3 describes different images and videos that are overlaid on an electronic map 300. Additionally and/or alternatively, different online picture albums showing different pictures may be overlaid over an electronic map 400 (FIG. 4). The position of the images in the map may include the actual geo-coordinate location. Map navigators may view different images while navigating the map. In some embodiments, different users and/or a service provider may share the images/videos in the electronic map. Additionally and/or alternatively the image or videos in the map may be restricted to social networking friends, friends of friends etc.

Image objects may be extracted from the images stored with the electronic map, for example by a service provider's server. The extracted image objects may be stored as part of the electronic map at the service provider's server. Accordingly, location and/or concentration of image objects may be identified. The server may de-duplicate the image objects while calculating the concentration of image objects at any place.

A user may log into an image portal and the user's multimedia (image or video) viewing history may be captured. Based on image object recognition methods known to those skilled in the art, objects that are viewed by the user at different point of time may be identified. A user image object viewing history may be analyzed in view of one or more of date, time day and rank of the viewed imaged objects, based on number of viewings. This information may be stored for the user as an image object viewing pattern.

Figure 5:
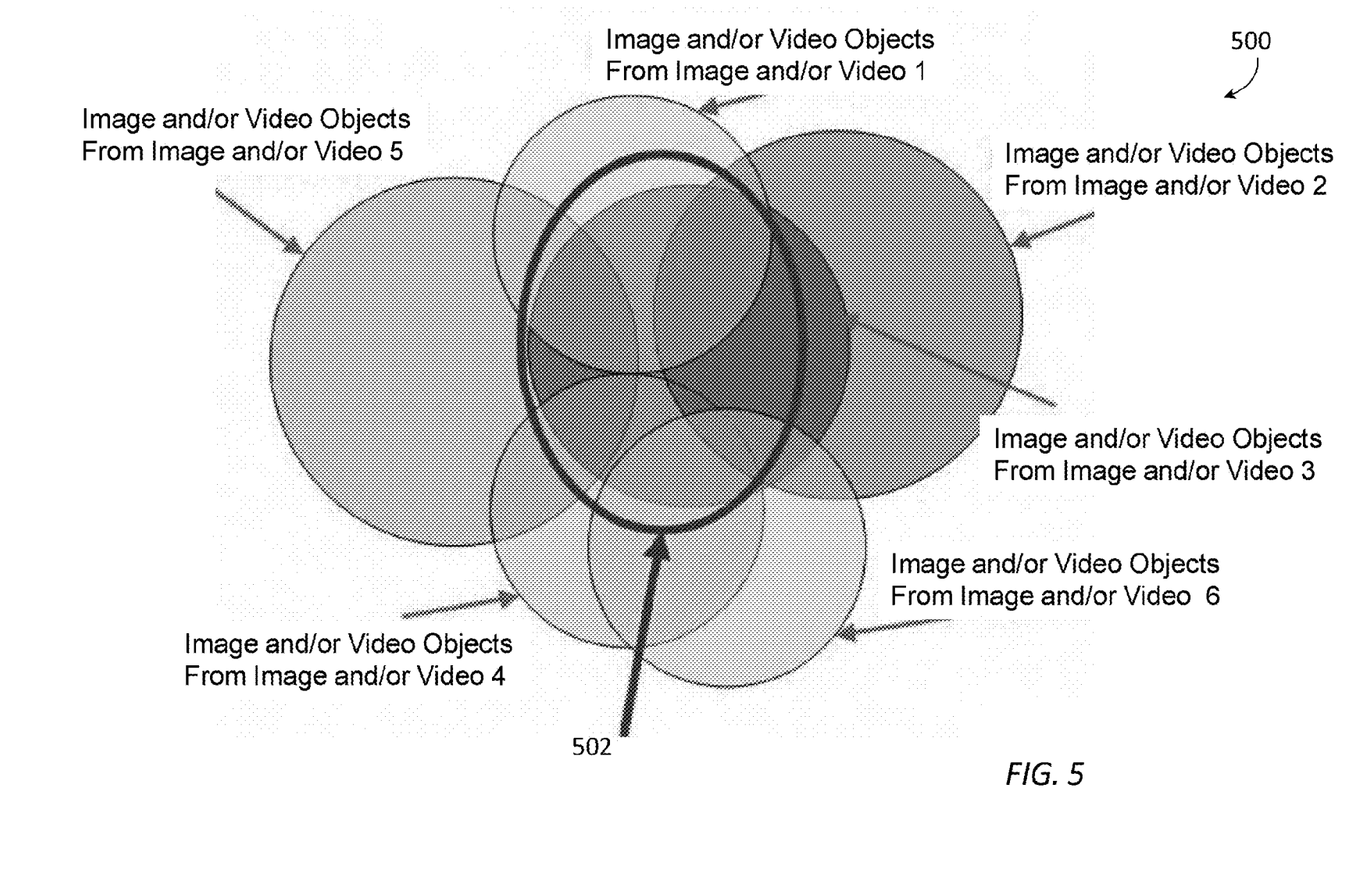
FIG. 5 is a pictorial representation of an example of identification of an image viewing pattern.

For example, FIG. 5 shows a non-limiting example of identification of a user's image object viewing pattern. Before traveling to any place, the place may be researched by looking at different online images from websites and/or image storage portals (like YouTube, Picasa etc). The research may assist the user understand the place before visiting. As shown in FIG. 5, the user has viewed a set of six images (photos or videos) each containing one or more image and/or video objects. Image/videos spheres 1-6 may be a function of the image objects. A center area describes the concentration of different image objects. For example, center area 502 may include a preferred image object that is depicted in each image/video 1-6. The more the overlap, the more the number of viewings of the preferred image object. Accordingly, one or more preferred video/image objects may be derived.

The preferred image object may include a single object or a collection of objects representing a common theme or area of interest. Nonlimiting examples of the preferred image object may include a common theme of one or more of scenic landscapes, historic buildings and landmarks, architecture of a certain type, bridges, statues, locations featured in movies, etc.

In some embodiments of the invention, limiting the area 502 to a "single object" may be too restrictive for the purpose of identifying routes that maximize the opportunity for encountering locations that match the user's interests. For example, if area 502 contained a statue of David and user was planning a route in China, there would be no route in the geographic region in China that contained the object David, but there would be many routes that would contain locations where user could see "statues".

Then, when a user requests driving directions for a particular destination, a route that includes driving past an image object that falls within the definition of the preferred image object that were viewed online by the user, may be recommended. For example, the user may want to find different possible routes between two places in the electronic map. The user may select the "personalized image object viewing pattern based route" option. The user's image object viewing history may be analyzed for the date, time and/or day, and appropriate image objects will be identified for the user.

Figure 6:
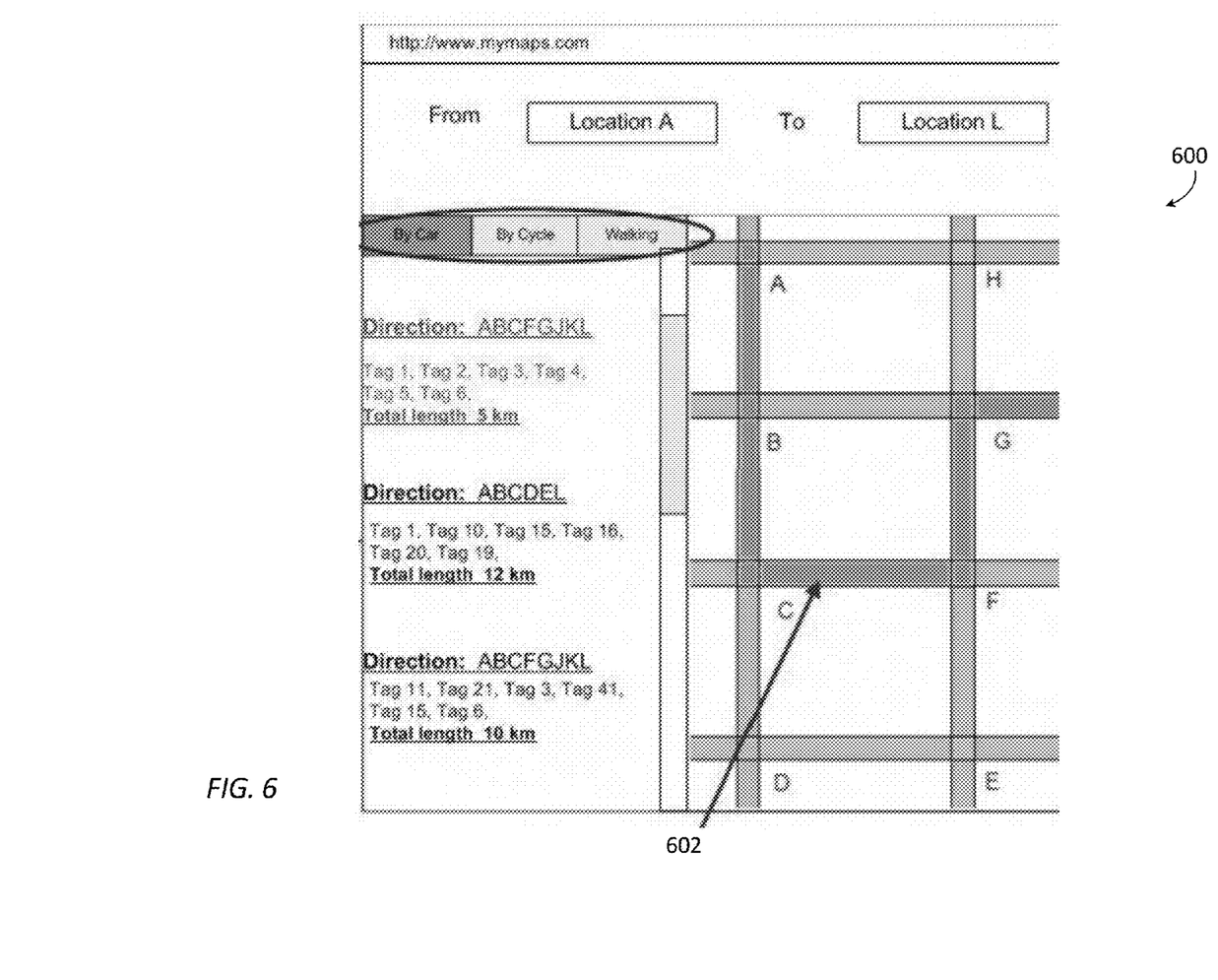
FIG. 6 is a pictorial representation of an example of a computer system in which illustrative embodiments may be implemented.

The image object viewing history may be an input, along with a start and end location to find route in electronic map. Possible routes may be identified in the electronic map based at least in part on user's viewing pattern of different objects and/or concentration of different objects in the electronic map. As shown in FIG. 6, one or more routes may be displayed in an electronic map 600, to satisfy user's object viewing interests. The user may select the route according to choice.

A selection of traveling modes may be provided, for example, by car, bicycle, and/or walking. The user may select the mode of travel. The recommended route may vary among the different modes of travel. A ranking of the routes may be provided and may be based at least in part on the user's image object viewing pattern. The preferred image objects available for viewing along the various routes are "tagged" or otherwise indicated to the user. The user may select the route or the tag he or she prefers. Upon selection of a route or "direction, the route may be highlighted in the map. In FIG. 6, route 602 Direction ABCFGJKL is selected and image objects Tag 1, 2, 3, 4, 5 and 6 are tagged as viewable along the selected route.

Figure 7:
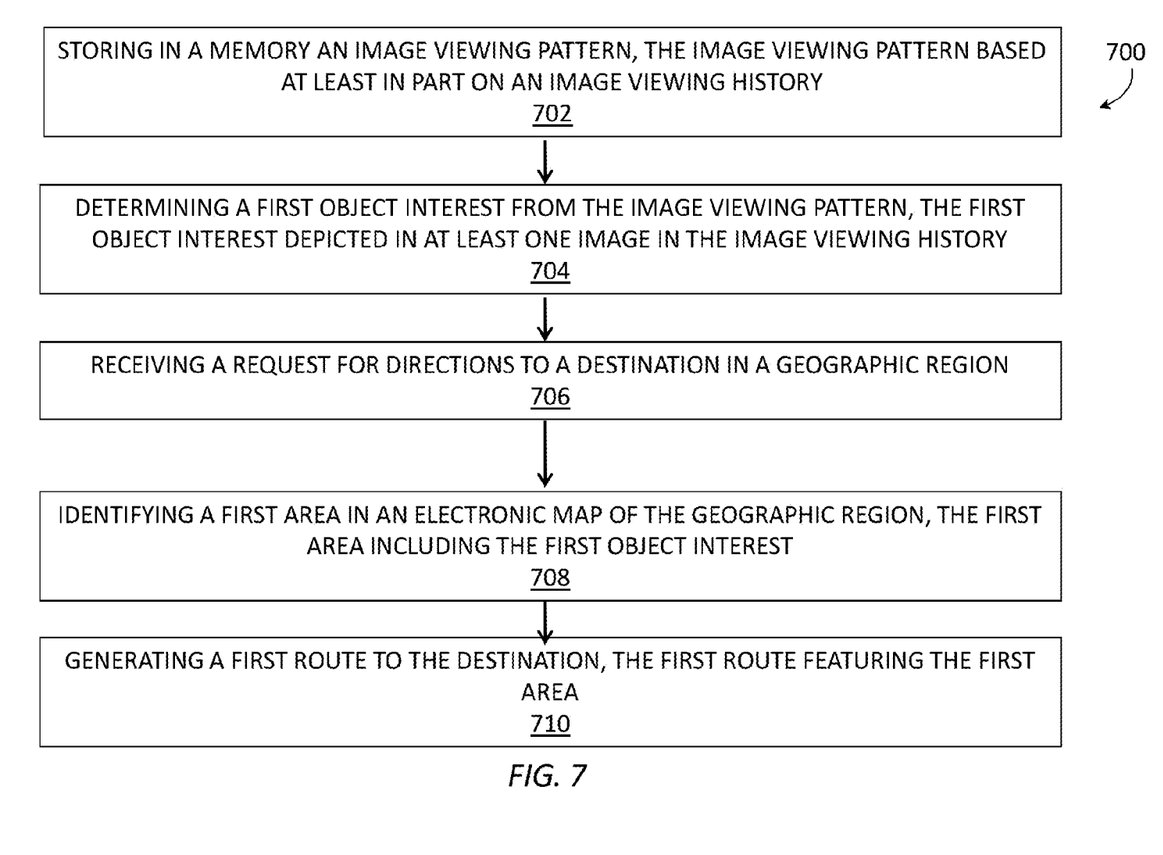
FIG. 7 is an example of a method of personalized route generation.

Referring now to FIG. 7, an example of a method 700, implemented in a computer system, of personalized route generation is provided. While FIG. 7 shows exemplary steps of a method according to one embodiment, other embodiments may omit, add to, and/or modify any of the steps shown in that figure. In step 702, an image viewing pattern may be stored in a memory. The image viewing pattern may be based at least in part on an image viewing history. In step 704, a first object viewing interest may be determined from the image viewing pattern. The first object viewing interest may be depicted in at least one image in the image viewing history. In step 706, a request may be received for directions to a destination in a geographic region. In step 708, a first area may be identified in an electronic map of the geographic region. The first area may include the first object viewing interest. In step 710, a first route to the destination may be generated. The first route may feature the first area.

Method 700 may include other steps. For example, method 700 may include storing in the memory a user profile, wherein the image viewing history includes a plurality of images accessed by the user profile. Additionally and/or alternatively, the image viewing pattern may be based at least in part on a user image preference provided by a user input. Additionally and/or alternatively, the method 700 may include displaying the first route on a display medium and indicating the first area on the display medium.

Some embodiments of the method 700 may include determining a second object viewing interest from the image viewing pattern, identifying a second area in the electronic map, the second area including the second object viewing interest, and generating a second route to the destination, the second route featuring the second area. Additionally and/or alternatively, the method 700 may include ranking the first route and the second route. The ranking may be based at least in part on the image viewing pattern. Additionally and/or alternatively, the rank of the first route may be based at least in part on a frequency the first object viewing interest is depicted in the viewing history and the rank of the second route may be based at least in part on a frequency the second object viewing interest is depicted in the viewing history.

Figure 8:
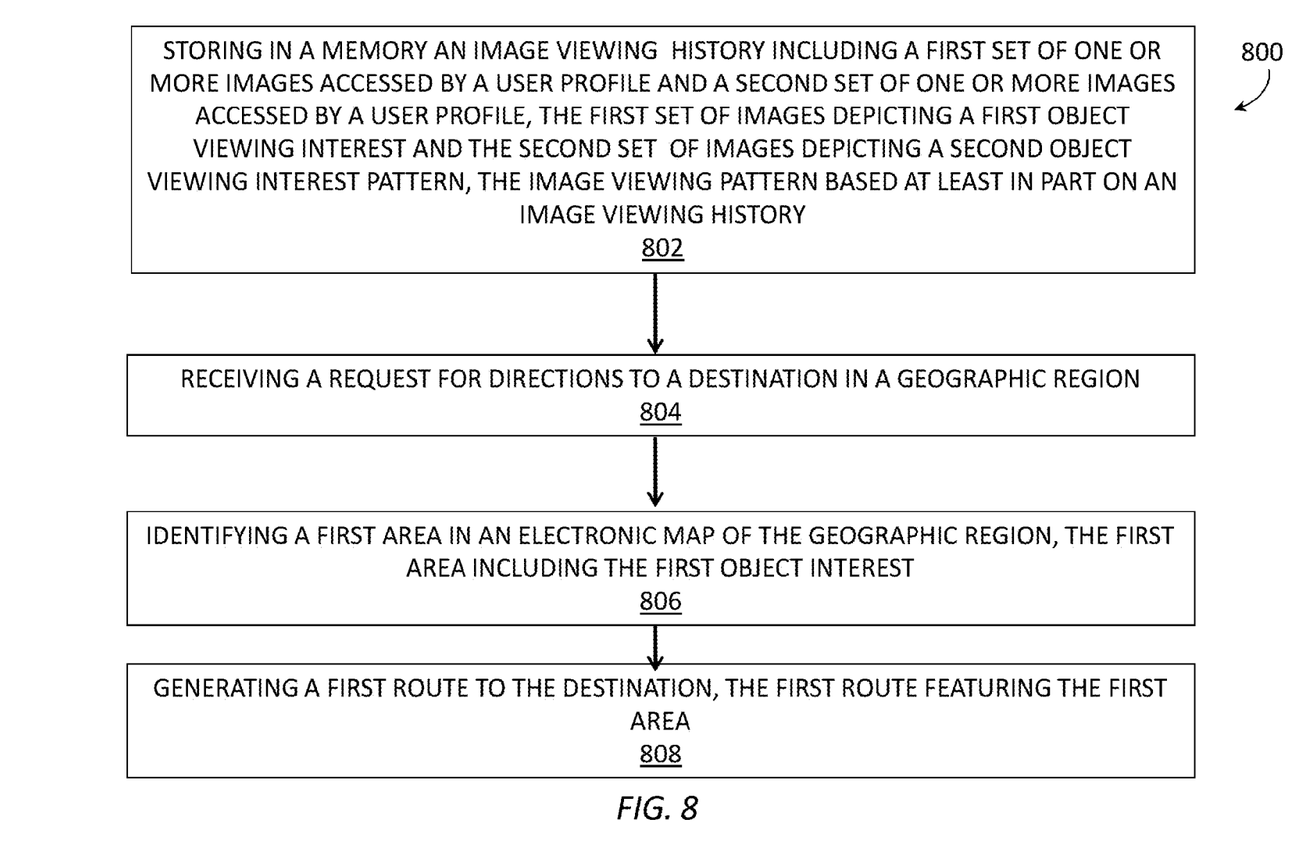
FIG. 8 is an example of a method of personalized route generation.

Referring now to FIG. 8, a further example of a method 800, implemented in a computer system, of personalized route generation is shown. While FIG. 8 shows exemplary steps of a method according to one embodiment, other embodiments may omit, add to, and/or modify any of the steps shown in that figure. In step 802, an image viewing history may be stored in a memory. The image viewing history may include a first set of one or more images accessed by a user profile and a second set of one or more images accessed by the user profile. The first set of images may depict a first object viewing interest and the second set of images may depict a second object viewing interest. In step 804, a request may be received for directions to a destination in a geographic region. In step 806, a first area may be identified in an electronic map of the geographic region. The first area may include the first object viewing interest. In step 808, a first route to the destination may be generated. The first route may feature the first area.

Method 800 may include other steps. For example, method 800 may include identifying a second area in the electronic map, the second area including the second object viewing interest, and generating a second route to the destination, the second route featuring the second area. Additionally and/or alternatively, the method 800 may include generating a third route to the destination, the third route featuring the first area and the second area. Additionally and/or alternatively, the method 800 may include displaying the first route and the second route on a display medium and indicating the first area and the second area on the display medium. Additionally and/or alternatively, the method 800 may include ranking the first route and the second route, wherein the ranking is based at least in part on the number of images in the first set and the number of images in the second set. In some embodiments of the present invention, the method 800 may further include generating an image viewing pattern based at least in part on the image viewing history.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some embodiments of the present invention may additionally and/or alternatively be described as a personalized physical object based route recommendation in electronic map and may include a method in which a personalized physical object based route recommendation in electronic map is generated. The method may include storing a user's viewing pattern information (when a computer user may view different photographs of monument, sculptures, building etc. from a web site), enabling the user to request driving directions for a particular destination, and enabling to recommend a route that includes driving past one or more of the user's viewing objects (monuments, sculptures, buildings) that were viewed online by the user Some embodiments of the present invention may additionally and/or alternatively be described as a personalized image object viewing pattern based route recommendation in electronic map and may include a method in which a user may be provided with multiple route recommendations based at least in part on a ranking of image object viewing. The method may include a feature that provides identification information of different objects available for viewing along the recommended route.

Some embodiments of the present invention may additionally and/or alternatively be described as a software or method to identify a user's image object viewing pattern. The image object viewing history may be based at least in part on images viewed from an electronic map. The method and software may include analyzing and storing user image object viewing pattern, and determining different possible routes between two places in electronic map based at least in part on the object viewing pattern. The method or software may include The method or software may include one or more of the following features: an option to allow user to select the "personalized image object viewing pattern based route" option; enabling the service provider to extract and calculating the concentration of image objects at any place; using image object viewing history as an input to find route in electronic map; identify possible route based on user's viewing pattern of different objects and concentration of images objects in the electronic map; providing one or more route to satisfy user's object viewing interest; allowing user to select the route according to this choice; providing the mode of travelling (by car, by bicycle, or by walking) and tags of the viewing's objects to the user; and/or enabling ranking of routes depending on the user's image object viewing pattern.

Some embodiments of the present invention may additionally and/or alternatively be described as follows: A computer user may view different photographs of monument, sculptures, buildings etc. from a web site (such as Flicker, Picasa etc). The invention stores the user's viewing pattern information. Then when a user requests driving directions for a particular destination, the invention may recommend a route that includes driving past one or more of the monuments, sculptures, buildings, that were viewed online by the user.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising:
   at least one computer readable non-transitory storage medium having computer readable program code embodied therewith, the computer readable program code, when read by a processor, configured to:
   store in a memory an image viewing pattern, the image viewing pattern based at least in part on an image viewing history of a user, the image viewing history for images viewed by the user on one or more devices accessible to the user;
   determine a first object viewing interest from the image viewing pattern, the first object viewing interest depicted in at least one image in the image viewing history;
   receive a request for directions to a destination in a geographic region;
   identify a first area in an electronic map of the geographic region, the first area including the first object viewing interest; and
   generate a first route to the destination, the first route featuring the first area, wherein at least one object viewing interest in the first area is visible by the user traveling along the first route.

2. The computer program product of claim 1 wherein the computer readable program code, when read by a processor, is further configured to:

store in the memory a user profile, wherein the image viewing history includes a plurality of images accessed by the user profile.

3. The computer program product of claim 2 wherein the computer readable program code, when read by a processor, is further configured to:
determine the image viewing pattern based at least in part on a user image preference provided by a user input, the user input stored in the user profile.

4. The computer program product of claim 1 wherein the computer readable program code, when read by a processor, is further configured to:
display the first route on a display medium; and indicate the first area on the display medium.

5. The computer program product of claim 1 wherein the computer readable program code, when read by a processor, is further configured to:
determine a second object viewing interest from the image viewing pattern;
identify a second area in the electronic map, the second area including the second object viewing interest; and
generate a second route to the destination, the second route featuring the second area.

6. The computer program product of claim 5 wherein the computer readable program code, when read by a processor, is further configured to:
rank the first route and the second route;
wherein the rank of the first route is based at least in part on a frequency the first object viewing interest is depicted in the viewing history and the rank of the second route is based at least in part on a frequency the second object viewing interest is depicted in the viewing history.

7. A computer, comprising:
a processor;
a memory; and
a route planning program including a plurality of instructions stored in the memory that are executed by the processor to:
store in the memory an image viewing pattern, the image viewing pattern based at least in part on an image viewing history a user, the image viewing history for images viewed by the user on one or more devices accessible to the user;
determine a first object viewing interest from the image viewing pattern, the first object viewing interest depicted in at least one image in the image viewing history;
receive a request for directions to a destination in a geographic region;
identify a first area in an electronic map of the geographic region, the first area including the first object viewing interest; and
generate a first route to the destination, the first route featuring the first area, wherein at least one object viewing interest in the first area is visible by the user traveling along the first route.

8. The computer of claim 7, wherein the plurality of instructions further includes instructions that are executed by the processor to:
store in the memory a user profile, wherein the image viewing history includes a plurality of images accessed by the user profile.

9. The computer of claim 8, wherein the plurality of instructions further includes instructions that are executed by the processor to:
determine the image viewing pattern based at least in part on a user image preference provided by user input, the user image preference stored in the user profile.

10. The computer of claim 7, wherein the plurality of instructions further includes instructions that are executed by the processor to:
determine a second object viewing interest from the image viewing pattern;
identify a second area in the electronic map, the second area including the second object viewing interest; and
generate a second route to the destination, the second route featuring the second area.

11. The computer of claim 10, wherein the plurality of instructions further includes instructions that are executed by the processor to:
rank the first route and the second route;
wherein the rank of the first route is based at least in part on a frequency the first object viewing interest is depicted in the viewing history and the rank of the second route is based at least in part on a frequency the second object viewing interest is depicted in the viewing history.

* * * * *